(12) United States Patent
Omer et al.

(10) Patent No.: US 8,340,416 B2
(45) Date of Patent: Dec. 25, 2012

(54) TECHNIQUES FOR ROBUST COLOR TRANSFER

(75) Inventors: Ido Omer, Redmond, WA (US); Eyal Ofek, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 362 days.

(21) Appl. No.: 12/823,760

(22) Filed: Jun. 25, 2010

(65) Prior Publication Data

US 2011/0317914 A1 Dec. 29, 2011

(51) Int. Cl.
*G06K 9/00* (2006.01)
(52) U.S. Cl. .................................................... 382/167
(58) Field of Classification Search .......... 382/162–167, 382/274–275, 254–255, 190, 294; 358/1.9, 358/518–522, 3.23, 3.26–3.27; 345/589–604; 348/221.1–223.1
See application file for complete search history.

(56) References Cited

U.S. PATENT DOCUMENTS

| | | | | |
|---|---|---|---|---|
| 5,416,890 | A * | 5/1995 | Beretta | 345/590 |
| 5,793,501 | A * | 8/1998 | Murakami | 358/520 |
| 7,133,083 | B2 | 11/2006 | Jaynes | |
| 7,239,750 | B2 * | 7/2007 | Rising | 382/190 |
| 7,317,843 | B2 * | 1/2008 | Sun et al. | 382/274 |
| 7,680,354 | B2 * | 3/2010 | Mei et al. | 382/255 |
| 2003/0135289 | A1 | 7/2003 | Rising | |
| 2005/0220359 | A1 | 10/2005 | Sun | |
| 2007/0177174 | A1* | 8/2007 | Won et al. | 358/1.9 |
| 2007/0223831 | A1 | 9/2007 | Mei | |
| 2009/0109452 | A1* | 4/2009 | Sawada | 358/1.9 |

FOREIGN PATENT DOCUMENTS

| | | |
|---|---|---|
| JP | 2007194810 A | 8/2007 |
| JP | 2009010983 A | 1/2009 |
| WO | 9728640 A1 | 8/1997 |

OTHER PUBLICATIONS

Tremeau, Alain et al., "Color in Image and Video Processing: Most Recent Trends and Future Research Directions", EURASIP Journal on Image and Video Processing, vol. 2008, Article ID 581371, Oct. 2, 2007, 26 pages.

Maslennikova, Alla et al., "Interactive Local Color Transfer Between Images", Graphics and Media Lab., Department of Computational Mathematics and Cybernetics, Lomonosov Moscow Sate Univeristy, Mosco, Russia, Retrieved Apr. 12, 2010, 4 pages.

Porikli, Faith, "Inter-Camera Color Calibration by Correlation Model Function", MERL—A Mitsubishi Electric Research Laboratory, Feb. 2004, 6 pages.

Lee, Ang et al., "Magic Brush", Retrieved Apr. 12,2010, 4 pages. http://anglee.org/proj/MagicBrush/index.htm.

(Continued)

*Primary Examiner* — Ishrat I Sherali

(57) ABSTRACT

Techniques and systems to transfer color robustly between images are described. In an embodiment, a technique for transferring color includes separating color information of a registered source image into a one dimensional luminosity channel and multi-dimensional chromatic channels. The technique further includes building a voting table, where each table cell is indexed by the chromatic coordinates from the source image and from the destination image. The table is built by adding to a count stored in a table cell indexed by the chromatic coordinates of the source pixel and the chromatic coordinates of its related destination pixel for each occurrence of such a pairing. The voting table values are used to identify a transfer color, and to adjust the colors of the source image to the colors of the destination image. Other embodiments are described and claimed.

20 Claims, 9 Drawing Sheets

OTHER PUBLICATIONS

Maciejewski, Ross et al., "Structuring Feature Space: A Non-Parametric Method for Volumetric Transfer Function Generation", IEEE Computer Society, Mar. 31, 2009, 8 pages.

Mertens, Tom et al., "Texture Transfer Using Geometry Correlation", Eurographics Symposium on Rendering, 2006, 12 pages.

"International Search Report", Mailed Date: Feb. 9, 2012, Application No. PCT/US2011/041541, Filed Date: Jun. 22, 2011, pp. 10.

* cited by examiner

600

MAP COLOR INFORMATION FOR SOURCE AND DESTINATION IMAGES INTO CHROMATIC CHANNELS
602

BUILD VOTING TABLE FROM CHROMATIC CHANNELS
604

PERFORM TRANSFER FOR THE LUMINOSITY CHANNEL
606

USE VOTING TABLE TO ADJUST COLORS OF THE SOURCE IMAGE
608

SEPARATE COLOR INFORMATION FOR SOURCE AND DESTINATION IMAGES INTO CHROMATIC CHANNELS
702

BUILD 1$^{ST}$ VOTING TABLE FROM CHROMATIC CHANNELS BETWEEN SOURCE IMAGE AND INTERMEDIATE DESTINATION IMAGE
704

BUILD 2$^{ND}$ VOTING TABLE BETWEEN INTERMEDIATE DESTINATION IMAGE AND A REFERENCE IMAGE
706

CONCATENATE 1$^{ST}$ AND 2$^{ND}$ VOTING TABLES INTO A 3$^{RD}$ VOTING TABLE
708

USE 3$^{RD}$ VOTING TABLE TO ADJUST COLORS OF THE SOURCE IMAGE
710

*FIG. 7*

TECHNIQUES FOR ROBUST COLOR TRANSFER

BACKGROUND

It may be desirable to join multiple images into a larger image. Mapping services, for example, may provide an aerial view of a mapped area by joining overlapping photographs of adjacent geographic areas. Photographic panoramas may be similarly constructed. The photographs or images used to create these larger views may differ from their neighbors in several ways. For example, the images may have been captured with different devices, at different times of day, during different atmospheric conditions such as haze or clouds, or have photometric differences. This may lead, in particular, to differences in local colors. For example, an image of an urban park taken with a first device in the morning may contain a lot of lighter green. An adjacent image of buildings near the park may have been taken later in the day or with a different camera, and may contain darker greens. Joining the images together may create a visual patchwork effect.

Conventional methods of transferring color or otherwise creating a more homogeneous color scheme may fail, or produce undesirable color changes, if the colors between the images are too disjoint. It is with respect to these and other considerations that the present improvements have been needed.

SUMMARY

This Summary is provided to introduce a selection of concepts in a simplified form that are further described below in the Detailed Description. This Summary is not intended to identify key features or essential features of the claimed subject matter, nor is it intended as an aid in determining the scope of the claimed subject matter. Various embodiments are generally directed to techniques to transfer color robustly. Some embodiments are particularly directed to techniques to transfer color robustly for overlapping images with disjoint color data. In one embodiment, for example, an apparatus may comprise a processor and color transfer components operative on the processor. A voting table builder operative on the processor may build a voting table. Each voting table cell may be indexed by multidimensional chromatic coordinates from a source image and a destination image. The table may be populated by determining the chromatic coordinate of each pixel in the source image and the chromatic coordinate of the corresponding pixel in the destination image. For each occurrence of a source and destination chromatic coordinate pair, the corresponding cell in voting table may be incremented. The apparatus may further comprise an image color adjuster operative on the processor, to adjust the colors of the source image to the colors of the destination image according to the counts in the voting table. Other embodiments are described and claimed.

These and other features and advantages will be apparent from a reading of the following detailed description and a review of the associated drawings. It is to be understood that both the foregoing general description and the following detailed description are explanatory only and are not restrictive of aspects as claimed.

BRIEF DESCRIPTION OF THE DRAWINGS

FIG. 6 illustrates an embodiment of a logic flow for robust color transfer.

FIG. 7 illustrates an embodiment of a second logic flow for robust color transfer.

DETAILED DESCRIPTION

Various embodiments are directed to providing a robust color transfer process to provide consistent color across multiple overlapping images. Such a robust transfer process may improve color consistency, for example, across multiple aerial images, when images were taken with different cameras, at different times of day, at different times of the year, or are inconsistent in color for other reasons. Embodiments of the invention provide a method of robust color transfer that unifies the photometric appearance of the multiple overlapping images. Embodiments of the method may build and use a robust non-parametric transfer function for multi-dimensional chromatic channels to transfer the chromatic appearance. Some embodiments use a homogenous intermediate destination image, such as a false color satellite image that overlaps the region shown in the multiple aerial images, to unify the photometric appearance of the multiple images.

Conventional techniques such as histogram transfer may work well for one dimensional data, such as grayscale images, but breaks down for higher dimensionality data. Histogram transfer conventionally works independently on each channel. Parametric color transfers may fail to capture the differences in appearance due to different photometric and atmospheric properties of the different images. Embodiments of the invention may provide a robust non-parametric transfer of colors between images with higher dimensionality.

Figure 1:
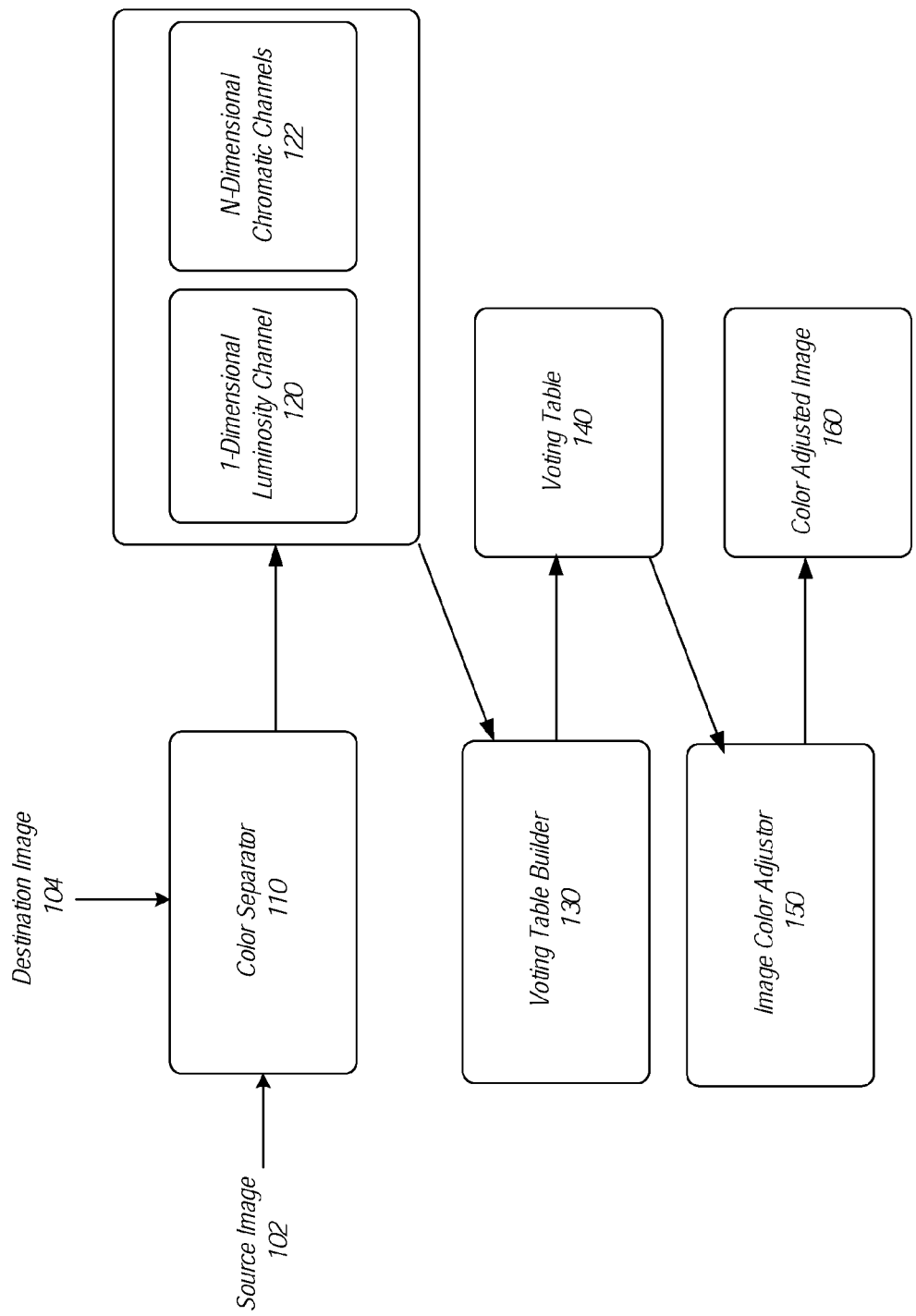
FIG. 1 illustrates an embodiment of a first system for robust color transfer.

FIG. 1 illustrates a block diagram for a system 100 to transfer the photometric appearance of one image to another. In one embodiment, for example, the system 100 may comprise a computer-implemented system 100 having multiple components, such as, but not limited to, color separator 110, voting table builder 130, and image color adjustor 150. As used herein the terms "system" and "component" are intended to refer to a computer-related entity, comprising either hardware, a combination of hardware and software, software, or software in execution. For example, a component can be implemented as a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers as desired for a given implementation. The embodiments are not limited in this context.

In the illustrated embodiment shown in FIG. 1, the system 100 may be implemented as part of an electronic device. Examples of an electronic device may include without limitation a mobile device, a personal digital assistant, a mobile computing device, a smart phone, a cellular telephone, a handset, a one-way pager, a two-way pager, a messaging device, a computer, a personal computer (PC), a desktop computer, a laptop computer, a notebook computer, a handheld computer, a server, a server array or server farm, a web server, a network server, an Internet server, a work station, a mini-computer, a main frame computer, a supercomputer, a network appliance, a web appliance, a distributed computing system, multiprocessor systems, processor-based systems, consumer electronics, programmable consumer electronics, television, digital television, set top box, wireless access point, base station, subscriber station, mobile subscriber center, radio network controller, router, hub, gateway, bridge, switch, machine, or combination thereof. Although the system 100 as shown in FIG. 1 has a limited number of elements in a certain topology, it may be appreciated that the system 100 may include more or less elements in alternate topologies as desired for a given implementation.

The components 110, 130, and 150 may be communicatively coupled via various types of communications media. The components 110, 130, and 150 may coordinate operations between each other. The coordination may involve the uni-directional or bi-directional exchange of information. For instance, the components 110, 130, and 150 may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

In various embodiments, the system 100 may comprise the component color separator 110. Color separator 110 may accept one or more registered source images 102 and one or more registered destination images 104. That the images are registered refers to the process of transforming and aligning the images such that pixels viewing the same part of a scene overlap. Color separator 110 may separate an image into a one-dimensional luminosity channel 120 and into N-dimensional chromatic channels 122, where $N \geq 2$. For the purposes of illustration, embodiments of the invention may be discussed below using three-dimensional chromatic channels, such as CIE-Lab or HSV color channels, separated into a one-dimensional luminosity channel and two-dimensional chromatic channels. The embodiments are not limited to these examples, or to three-dimensional color channels.

In various embodiments, the system 100 may comprise the component voting table builder 130. Voting table builder 130 may accept the N-dimensional chromatic channels 122 to construct a voting table 140. An N-dimensional color channels may have an N-dimensional coordinate in color space. For example, in a two-dimensional chromatic channel for a color space such as CIE-Lab or HSV, a color space coordinate may have a two-dimensional coordinate X, Y. Each cell of voting table 140 may be indexed by the chromatic coordinate of a source image pixel and the chromatic coordinate of a destination image pixel. A cell in voting table 140 may itself be a 2×N table, where one table cell corresponds to the source image and the other table cell corresponds to the destination image.

Voting table builder 130 may determine the chromatic coordinate of each pixel in the source image and the chromatic coordinate of the corresponding pixel in the destination image. For each occurrence of a source and destination chromatic coordinate pair, voting table builder 130 may increment the corresponding cell in voting table 140. For example, if a source pixel is light green, then its coordinate may be (X1green, Y1green). "X1green" may correspond to some value in a particular chromatic channel, for example an H value for light green in HSV space. Similarly, Y1green may correspond to a particular S value for light green in HSV space. If the corresponding pixel in the destination is dark green, its coordinate may be (Xdgreen, Ydgreen). In that case, a count in table cell {(X1green, Y1green), (Xdgreen, Ydgreen)} may be incremented. In an embodiment, the voting table 140 may be smoothed to reduce noise.

In various embodiments, the system 100 may comprise the component image color adjuster 150. Image color adjuster 150 may use voting table 140 to determine what colors to change to translate color from the source image to color from the destination image to produce color adjusted image 160. In an embodiment, image color adjuster 150 may construct a transfer function or vector field from the voting table. In an embodiment, image color adjuster 150 may identify and store the destination color that has the highest count for a given source color as the new color. Other methods of choosing a new color may also be used. For example, an average or a median color value may be selected as the new color. Image color adjuster 150 may apply robust statistics to the voting table values to arrive at a new color for a given source color. The embodiments are not limited to these examples.

In an embodiment, system 100 may be implemented as a centralized system, including all of the structure and/or operations for system 100 in a single computing entity, such as a single computing device.

Figure 2:
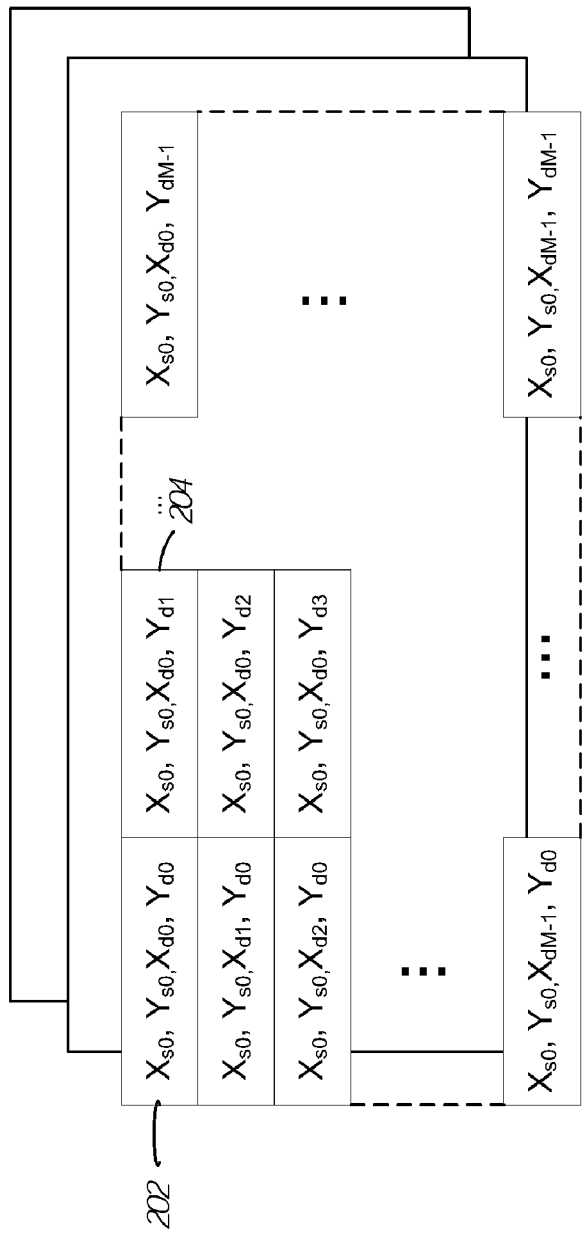
FIG. 2 illustrates an embodiment of a voting table.

FIG. 2 illustrates a diagram of a portion of a voting table 200. Voting table 200 illustrates a voting table for a two-dimensional chromatic channel. Voting table 200 may have a table cell for each combination of chromatic coordinates (X, Y). For example, table cell 202 may correspond to the combination of the first chromatic coordinate X0, Y0 in the source image and also in the destination image. Table cell 204 may correspond to the combination of the first chromatic coordinate X0, Y0 for the source image, and the chromatic coordinate X0, Y1 for the destination image. Table cell 204 would be incremented if a source pixel changed from X0, Y0 to X0, Y1 in the destination image, otherwise the count for table cell 204 would remain at zero.

Figure 3:
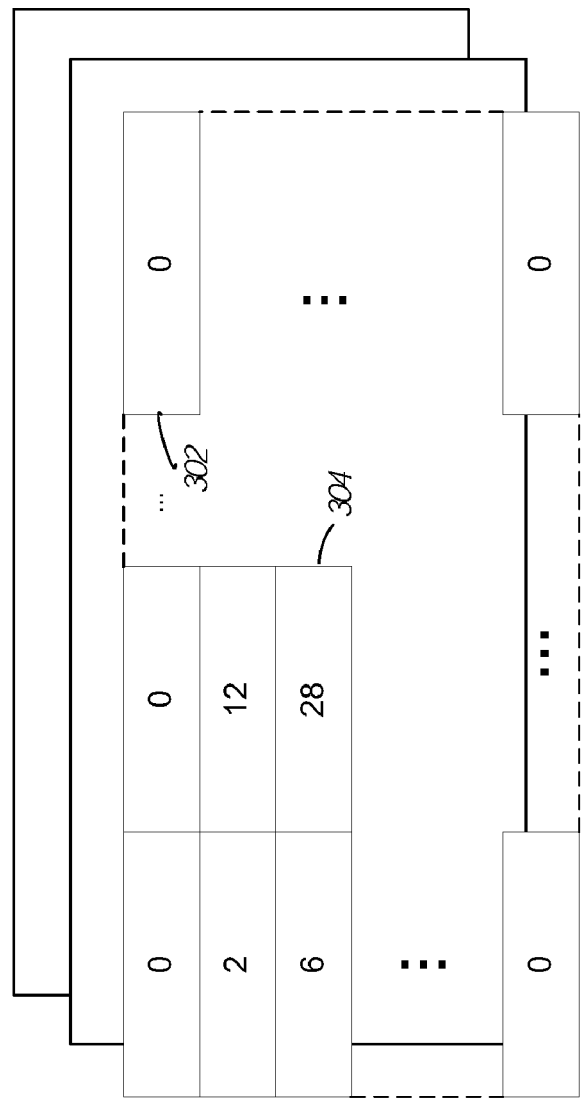
FIG. 3 illustrates an embodiment of a completed voting table.

FIG. 3 illustrates a diagram of a portion of a voting table 300 after the table is built. Table cell 302 contains a count of zero (0), indicating that there were no instances where the source color coordinates changed to the destination color coordinates for the coordinate pair represented by table cell 302. Table cell 304 contains a count of 28, indicating that there were 28 instances where the source color coordinates changed to the destination color coordinates for the coordinate pair represented by table cell 304. In an embodiment, voting table 300 may be smoothed to reduce noise.

Figure 4:
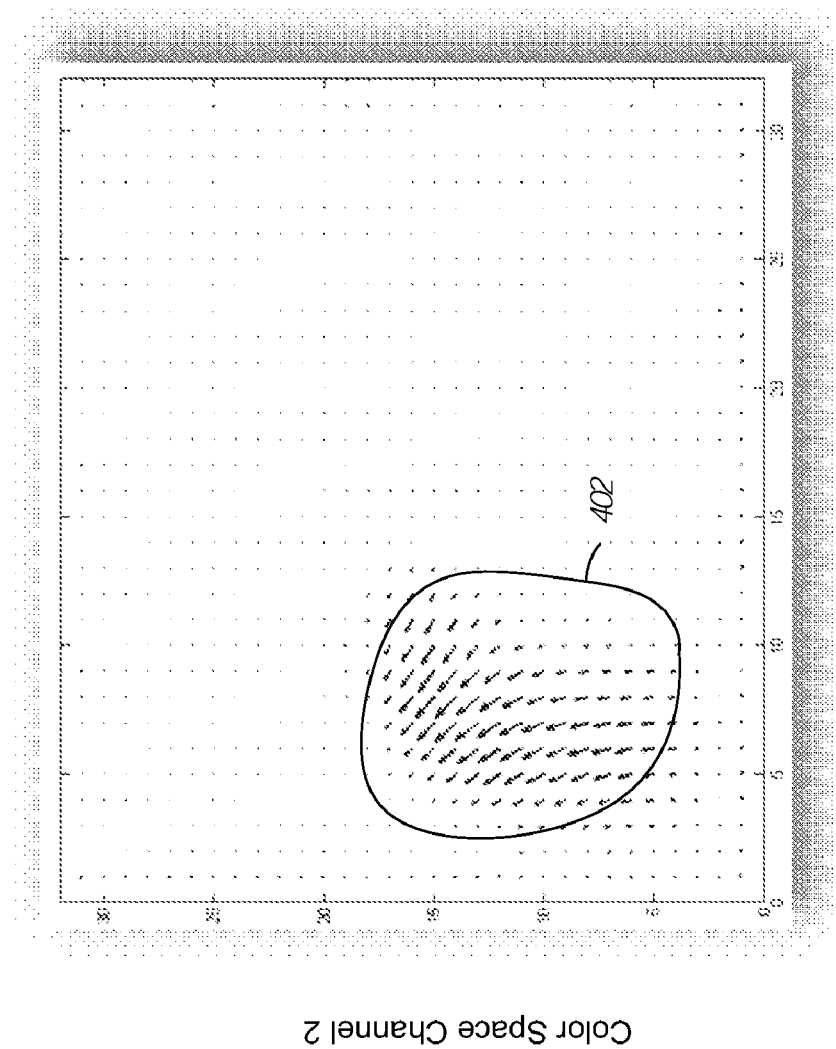
FIG. 4 illustrates an embodiment of a vector field graph.

FIG. 4 illustrates a graph of a vector field 400. Vector field 400 may be constructed from voting table 140. Voting table builder 130 may construct a vector field by identifying, in voting table 140, the destination chromatic coordinate having the highest count for a given source chromatic coordinate. For the identified destination chromatic coordinate, the destination chromatic coordinate may be stored with the highest count value. In an embodiment, other values may be used, such as the average, median, or other robust statistical value. The output of this process may be a vector field, such as vector field 400.

Vector field 400 illustrates a two-dimensional color space channel. The horizontal axis represents one color space channel, while the vertical axis represents the second color space channel. For example, in an HSV color space, the horizontal axis may represent the 'H' channel, and the vertical axis may represent the 'S' channel. Vector field 400 may illustrate the new value for each coordinate in the color space. Coordinates having large arrows, such as those shown generally within the region indicated by circle 402, may indicate a larger degree of change.

Figure 5:
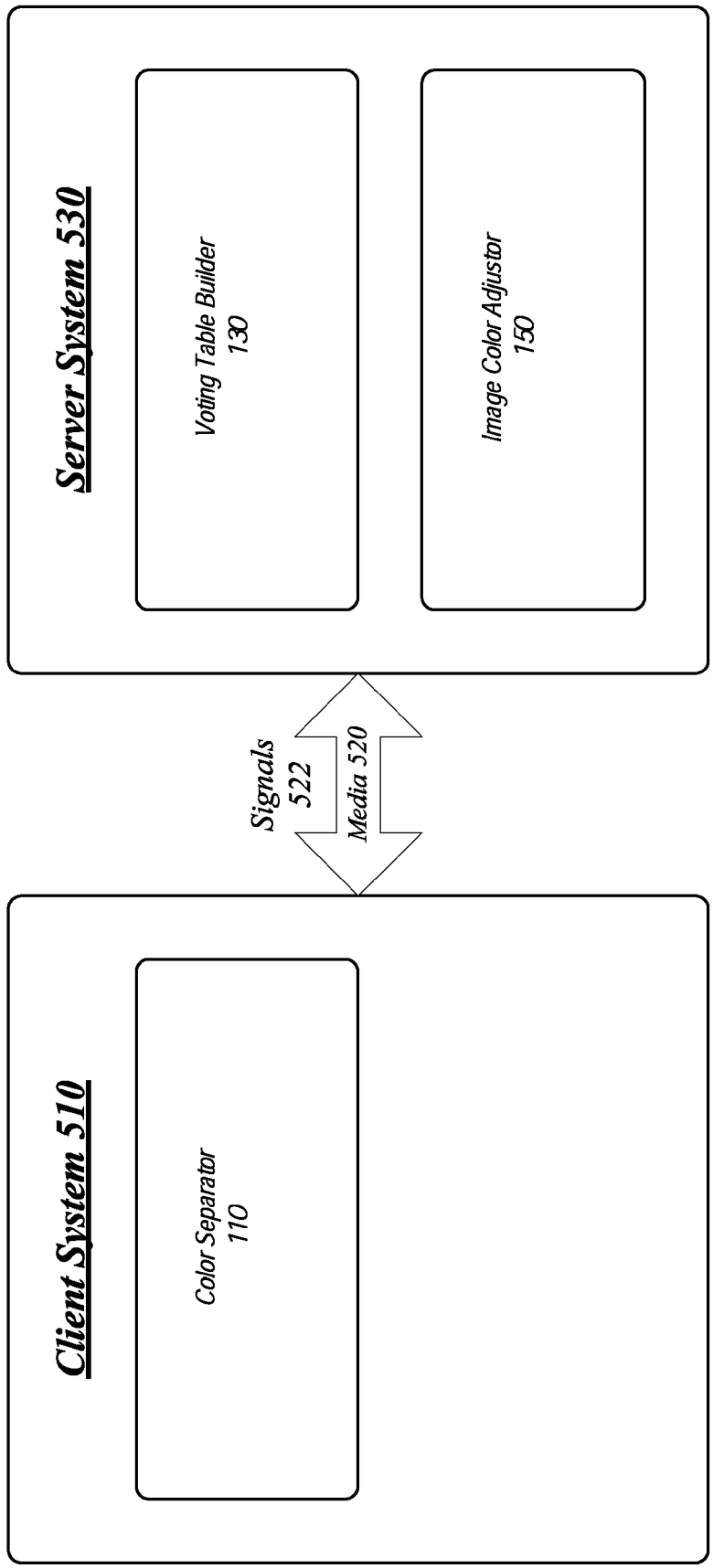
FIG. 5 illustrates an embodiment of a distributed system for robust color transfer.

FIG. 5 illustrates a block diagram of a distributed system 500. The distributed system 500 may distribute portions of the structure and/or operations for the system 100 across multiple computing entities. Examples of distributed system 500 may include without limitation a client-server architecture, a 3-tier architecture, an N-tier architecture, a tightly-coupled or clustered architecture, a peer-to-peer architecture, a master-slave architecture, a shared database architecture, and other types of distributed systems. The embodiments are not limited in this context.

In one embodiment, for example, the distributed system 500 may be implemented as a client-server system. A client 510 may implement the color separator 110. A server 530 may implement the voting table builder 130 and image color adjuster 150. The client 510 and the server 530 may communicate with each over a communications media 520 using communications signals 522. In one embodiment, for example, the communications media may comprise wired or wireless communications. In one embodiment, for example, the communications signals 322 may comprise luminosity channel 120, chromatic channels 122, voting table 140 and/or color adjusted image 160.

In an embodiment, client 510 may request an image, such as an aerial map for a mapping application, from server 530. Server 530 may then generate or retrieve color adjusted image 160 and communicate the image to client 510.

Operations for the above-described embodiments may be further described with reference to one or more logic flows. It may be appreciated that the representative logic flows do not necessarily have to be executed in the order presented, or in any particular order, unless otherwise indicated. Moreover, various activities described with respect to the logic flows can be executed in serial or parallel fashion. The logic flows may be implemented using one or more hardware elements and/or software elements of the described embodiments or alternative elements as desired for a given set of design and performance constraints. For example, the logic flows may be implemented as logic (e.g., computer program instructions) for execution by a logic device (e.g., a general-purpose or specific-purpose computer).

FIG. 6 illustrates one embodiment of a logic flow 600. The logic flow 600 may be representative of some or all of the operations executed by one or more embodiments described herein.

In the illustrated embodiment shown in FIG. 6, the logic flow 600 maps an image into a luminosity channel and multidimensional chromatic channels at block 602. For example, for each pixel in an image, color separator 110 may place the brightness value in the luminosity channel, and the two or more chromatic values, e.g. color and sharpness, into the multidimensional chromatic channel. The logic flow 600 may perform block 602 for each pixel in one or more source images, and for one or more destination images.

The logic flow 600 may build a voting table at block 604 from the chromatic channels. Each cell in the voting table may be initialized to zero. Then voting table builder 130 may, for each pixel in the source image, increment the table cell corresponding to the source image pixel chromatic value and the registered destination pixel chromatic value. That is, for a source pixel having the chromatic coordinate (Xs, Ys) where the source pixel's registered destination pixel has the chromatic coordinate (Xd, Yd), the table cell [(Xs, Ys), (Xd, Yd)] may be incremented. Once the voting table is constructed, then a vector field and/or transfer table may be constructed. For a given chromatic coordinate in the source image (i.e. holding (Xs,Ys) fixed), the counts for each cell of the destination chromatic coordinates are examined. In an embodiment, the destination chromatic coordinates of the cell having the highest count determines what the transfer color will be. For example, if the cell [(Xs, Ys), (Xdi, Ydi)] has the highest count, then (Xdi, Ydi) will be the transfer color for all instances of (Xs, Ys). Instead of using a simple majority, embodiments may calculate a function on some or all of the destination chromatic coordinate values, such as an average value, a median value, a robust average value, fitting a Gaussian or other parametric shape to the data, etc.

The logic flow 600 may transfer luminosity from the source image to the destination image in block 606. In an embodiment, conventional one-dimensional histogram transfer may be used. In another embodiment, a voting table such as described above may be constructed for the luminosity channel. Luminosity may then be transferred in an analogous manner to that described below regarding block 608.

The logic flow 600 may use the voting table to adjust the colors of the source image at block 608. For example, color adjuster 150 may use the voting table to determine what colors to change to translate color from the source image to color from the destination image to produce a color adjusted image. In an embodiment, color adjustor 150 may construct a vector field as described above to determine what colors to transfer. In an embodiment, image color adjuster 150 may use the destination color that has the highest count for a given source color as the new color. Other methods of choosing a new color may also be used. For example, an average or a median color value may be selected as the new color. Image color adjuster 150 may apply robust statistics to the voting table values to arrive at a new color for a given source color. The embodiments are not limited to these examples.

FIG. 7 illustrates one embodiment of a logic flow 700. The logic flow 700 may be representative of some or all of the operations executed by one or more embodiments described herein. The logic flow 700 may apply to two or more source images that are adjacent to each other but do not necessarily overlap.

In the illustrated embodiment shown in FIG. 7, the logic flow 700 separates the source images into a luminosity channel and multidimensional chromatic channels at block 702, as in block 602 from FIG. 6.

The logic flow 700 may build a first voting table from the chromatic channels between at least one of the source images and an intermediate destination image in block 704. The voting table may be built in the manner described above. The intermediate destination image may be an image that is more homogenous in color than the source images. The intermediate destination image may be lower resolution, lower quality, and/or may lack one or more colors. The intermediate destination image may overlap most or all of the source images. Examples may include satellite images of the same area shown in the source images from, for example, LANDSAT, Spot or BlueMarble.

The logic flow 700 may build a second voting table from the intermediate destination image to a reference image in block 706. The reference image may be one of the source images. The reference image may be a source image selected for having the most desirable colors, or meeting other subjective or objective criteria that make the reference image colors the target for color transfer. The reference image may be another image, such as a conglomeration of images. The embodiments are not limited to these examples.

The logic flow 700 may concatenate the first and second voting tables in block 708. The resulting third voting table effectively maps a color transfer from the source to the reference image by way of the homogenizing intermediate image.

The logic flow 700 may adjust the colors of the source image using the third voting table in block 710, similarly to the operation of block 608.

Embodiments of the invention may allow the method described herein to be applied locally rather than globally. For example, if a large image contains many diverse regions, such as a coast line, desert and mountains, voting tables may be built for smaller areas that are similar to each other. The color transfers to those regions may then be interpolated to join the regions together to a larger unified image.

Figure 8:
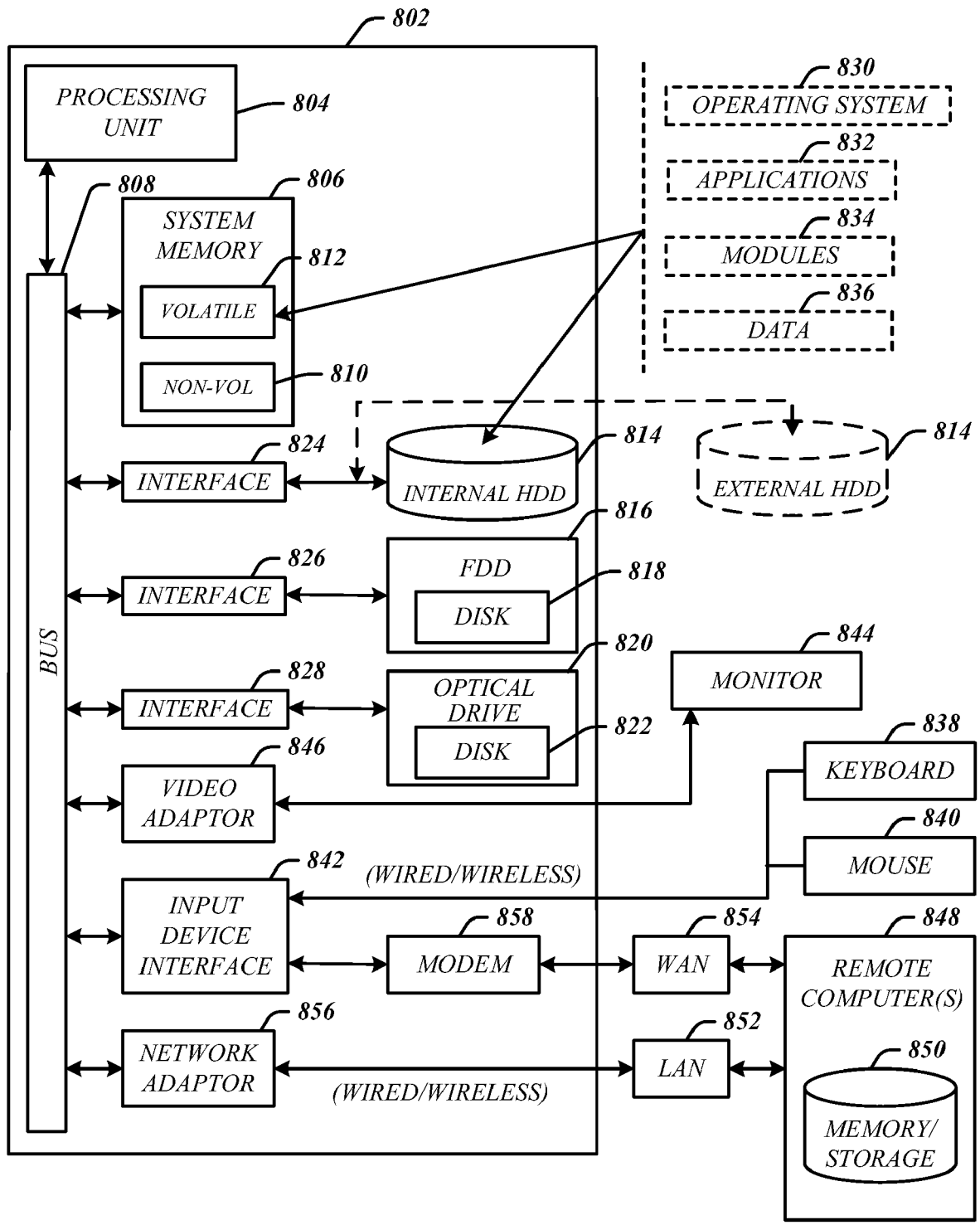
FIG. 8 illustrates an embodiment of a computing architecture.

FIG. 8 illustrates an embodiment of an exemplary computing architecture 800 suitable for implementing various embodiments as previously described. The computing architecture 800 includes various common computing elements, such as one or more processors, co-processors, memory units, chipsets, controllers, peripherals, interfaces, oscillators, timing devices, video cards, audio cards, multimedia input/output (I/O) components, and so forth. The embodiments, however, are not limited to implementation by the computing architecture 800.

As shown in FIG. 8, the computing architecture 800 comprises a processing unit 804, a system memory 806 and a system bus 808. The processing unit 804 can be any of various commercially available processors. Dual microprocessors and other multi-processor architectures may also be employed as the processing unit 804. The system bus 808 provides an interface for system components including, but not limited to, the system memory 806 to the processing unit 804. The system bus 808 can be any of several types of bus structure that may further interconnect to a memory bus (with or without a memory controller), a peripheral bus, and a local bus using any of a variety of commercially available bus architectures.

The system memory 806 may include various types of memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, or any other type of media suitable for storing information. In the illustrated embodiment shown in FIG. 8, the system memory 806 can include non-volatile memory 810 and/or volatile memory 812. A basic input/output system (BIOS) can be stored in the non-volatile memory 810.

The computer 802 may include various types of computer-readable storage media, including an internal hard disk drive (HDD) 814, a magnetic floppy disk drive (FDD) 816 to read from or write to a removable magnetic disk 818, and an optical disk drive 820 to read from or write to a removable optical disk 822 (e.g., a CD-ROM or DVD). The HDD 814, FDD 816 and optical disk drive 820 can be connected to the system bus 808 by a HDD interface 824, an FDD interface 826 and an optical drive interface 828, respectively. The HDD interface 824 for external drive implementations can include at least one or both of Universal Serial Bus (USB) and IEEE 1394 interface technologies.

The drives and associated computer-readable media provide volatile and/or nonvolatile storage of data, data structures, computer-executable instructions, and so forth. For example, a number of program modules can be stored in the drives and memory units 810, 812, including an operating system 830, one or more application programs 832, other program modules 834, and program data 836. The one or more application programs 832, other program modules 834, and program data 836 can include, for example, color separator 110, voting table builder 130 and image color adjuster 150.

A user can enter commands and information into the computer 802 through one or more wire/wireless input devices, for example, a keyboard 838 and a pointing device, such as a mouse 840. Other input devices may include a microphone, an infra-red (IR) remote control, a joystick, a game pad, a stylus pen, touch screen, or the like. These and other input devices are often connected to the processing unit 804 through an input device interface 842 that is coupled to the system bus 808, but can be connected by other interfaces such as a parallel port, IEEE 1394 serial port, a game port, a USB port, an IR interface, and so forth.

A monitor 844 or other type of display device is also connected to the system bus 808 via an interface, such as a video adaptor 846. In addition to the monitor 844, a computer may include other peripheral output devices, such as speakers, printers, and so forth.

The computer 802 may operate in a networked environment using logical connections via wire and/or wireless communications to one or more remote computers, such as a remote computer 848. The remote computer 848 can be a workstation, a server computer, a router, a personal computer, portable computer, microprocessor-based entertainment appliance, a peer device or other common network node, and typically includes many or all of the elements described relative to the computer 802, although, for purposes of brevity, only a memory/storage device 850 is illustrated. The logical connections depicted include wire/wireless connectivity to a local area network (LAN) 852 and/or larger networks, for example, a wide area network (WAN) 854. Such LAN and WAN networking environments are commonplace in offices and companies, and facilitate enterprise-wide computer networks, such as intranets, all of which may connect to a global communications network, for example, the Internet.

When used in a LAN networking environment, the computer 802 is connected to the LAN 852 through a wire and/or wireless communication network interface or adaptor 856. The adaptor 856 can facilitate wire and/or wireless communications to the LAN 852, which may also include a wireless access point disposed thereon for communicating with the wireless functionality of the adaptor 856.

When used in a WAN networking environment, the computer 802 can include a modem 858, or is connected to a communications server on the WAN 854, or has other means for establishing communications over the WAN 854, such as by way of the Internet. The modem 858, which can be internal or external and a wire and/or wireless device, connects to the system bus 808 via the input device interface 842. In a networked environment, program modules depicted relative to the computer 802, or portions thereof, can be stored in the remote memory/storage device 850. It will be appreciated that the network connections shown are exemplary and other means of establishing a communications link between the computers can be used.

The computer 802 is operable to communicate with wire and wireless devices or entities using the IEEE 802 family of standards, such as wireless devices operatively disposed in wireless communication (e.g., IEEE 802.7 over-the-air modulation techniques) with, for example, a printer, scanner, desktop and/or portable computer, personal digital assistant (PDA), communications satellite, any piece of equipment or location associated with a wirelessly detectable tag (e.g., a kiosk, news stand, restroom), and telephone. This includes at least Wi-Fi (or Wireless Fidelity), WiMax, and Bluetooth™ wireless technologies. Thus, the communication can be a predefined structure as with a conventional network or simply an ad hoc communication between at least two devices. Wi-Fi networks use radio technologies called IEEE 802.7x (a, b, g, etc.) to provide secure, reliable, fast wireless connectivity. A Wi-Fi network can be used to connect computers to each other, to the Internet, and to wire networks (which use IEEE 802.3-related media and functions).

Figure 9:
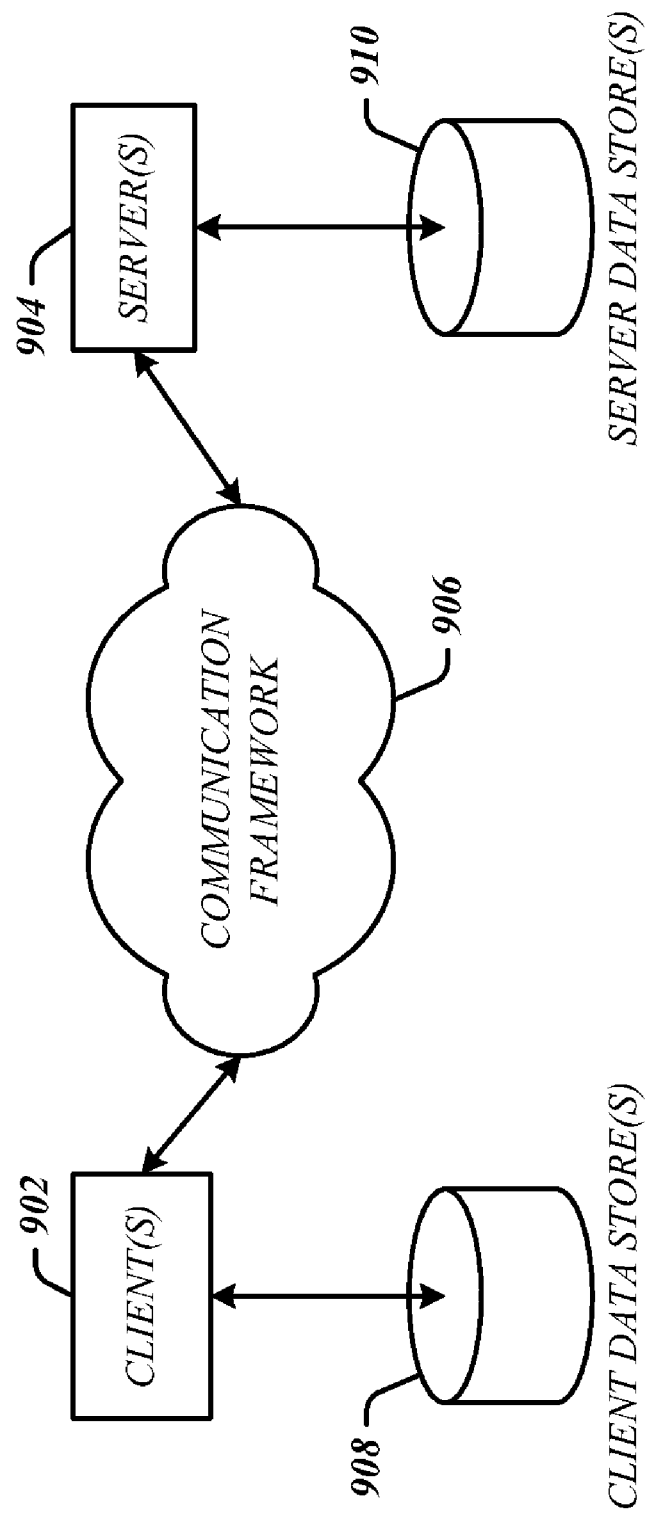
FIG. 9 illustrates an embodiment of a communications architecture.

FIG. 9 illustrates a block diagram of an exemplary communications architecture 900 suitable for implementing various embodiments as previously described. The communications architecture 900 includes various common communications elements, such as a transmitter, receiver, transceiver, radio, network interface, baseband processor, antenna, amplifiers, filters, and so forth. The embodiments, however, are not limited to implementation by the communications architecture 900.

As shown in FIG. 9, the communications architecture 900 comprises includes one or more clients 902 and servers 904. The clients 902 may implement the client systems 310, 400. The servers 904 may implement the server system 330. The clients 902 and the servers 904 are operatively connected to one or more respective client data stores 908 and server data stores 910 that can be employed to store information local to the respective clients 902 and servers 904, such as cookies and/or associated contextual information.

The clients 902 and the servers 904 may communicate information between each other using a communication framework 906. The communications framework 906 may implement any well-known communications techniques, such as techniques suitable for use with packet-switched networks (e.g., public networks such as the Internet, private networks such as an enterprise intranet, and so forth), circuit-switched networks (e.g., the public switched telephone network), or a combination of packet-switched networks and circuit-switched networks (with suitable gateways and translators). The clients 902 and the servers 904 may include various types of standard communication elements designed to be interoperable with the communications framework 906, such as one or more communications interfaces, network interfaces, network interface cards (NIC), radios, wireless transmitters/receivers (transceivers), wired and/or wireless communication media, physical connectors, and so forth. By way of example, and not limitation, communication media includes wired communications media and wireless communications media. Examples of wired communications media may include a wire, cable, metal leads, printed circuit boards (PCB), backplanes, switch fabrics, semiconductor material, twisted-pair wire, co-axial cable, fiber optics, a propagated signal, and so forth. Examples of wireless communications media may include acoustic, radio-frequency (RF) spectrum, infrared and other wireless media. One possible communication between a client 902 and a server 904 can be in the form of a data packet adapted to be transmitted between two or more computer processes. The data packet may include a cookie and/or associated contextual information, for example.

Various embodiments may be implemented using hardware elements, software elements, or a combination of both. Examples of hardware elements may include devices, components, processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

Some embodiments may comprise an article of manufacture. An article of manufacture may comprise a storage medium to store logic. Examples of a storage medium may include one or more types of computer-readable storage media capable of storing electronic data, including volatile memory or non-volatile memory, removable or non-removable memory, erasable or non-erasable memory, writeable or re-writeable memory, and so forth. Examples of the logic may include various software elements, such as software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. In one embodiment, for example, an article of manufacture may store executable computer program instructions that, when executed by a computer, cause the computer to perform methods and/or operations in accordance with the described embodiments. The executable computer program instructions may include any suitable type of code, such as source code, compiled code, interpreted code, executable code, static code, dynamic code, and the like. The executable computer program instructions may be implemented according to a predefined computer language, manner or syntax, for instructing a computer to perform a certain function. The instructions may be implemented using any suitable high-level, low-level, object-oriented, visual, compiled and/or interpreted programming language.

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

It is emphasized that the Abstract of the Disclosure is provided to comply with 37 C.F.R. Section 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. A computer-implemented method, comprising:
   mapping color information of a registered source image into a one dimensional luminosity channel and multi-dimensional chromatic channels;
   building a voting table, where each table cell is indexed by the chromatic coordinates from the source image and chromatic coordinates from a registered destination image, and wherein building the table comprises:
   for each pixel in the source image, incrementing a count stored in the table cell indexed by the chromatic coordinates of the source pixel and the chromatic coordinates of the source pixel's related destination pixel;
   identifying a transfer color for each pixel in the source image based on the voting table; and
   using the identified transfer colors to adjust the colors of the source image.

2. The method of claim 1, further comprising:
   smoothing the voting table to remove noise.

3. The method of claim 1, further comprising:
   performing one-dimensional histogram transfer for the one dimensional luminosity channel between the source image and the destination image.

4. The method of claim 1, wherein identifying a transfer color comprises:
   for each source image chromatic coordinate in the voting table, identifying a value of one of: the maximum count, an average of the counts, a median value of the counts, or the result of robust statistics applied to the counts;
   identifying the destination chromatic coordinates of the identified value; and
   using the identified destination chromatic coordinates as the transfer color for pixels having the source image chromatic coordinate.

5. The method of claim 1, further comprising:
   building a first voting table from the source image to an intermediate destination image, wherein the intermediate destination image is a homogeneous color image;
   building a second voting table from the intermediate destination image to a reference image;
   concatenating the first and second voting tables to make a third table; and
   using the third voting table to adjust the colors of the source image to the colors of the reference image.

6. The method of claim 5, wherein the reference image is a source image.

7. The method of claim 5, wherein the intermediate destination image is a false color image.

8. The method of claim 1, wherein the source image is comprised of a plurality of source images, and the destination image comprises one image showing an area shown by the plurality of source images.

9. An article comprising a computer readable storage medium containing instructions that if executed enable a system to:
   map an image into a one-dimensional luminosity channel and multi-dimensional chromatic channels;
   build a voting table for two registered images, where each table cell is indexed by the chromatic coordinates from the first image and chromatic coordinates from the second image, and wherein building the table comprises:
   for each pixel in the source image, incrementing a count stored in the table cell indexed by the chromatic coordinates of the source pixel and the chromatic coordinates of the source pixel's related destination pixel;
   compute a vector field from the voting table; and
   use the vector field to adjust the colors of the source image to the colors of the destination image.

10. The article of claim 9, wherein the instructions to compute a vector field comprise instructions that if executed enable the system to:
    identify the destination chromatic coordinate having the maximum count for each source image chromatic coordinate in the voting table; and
    store the maximum count and the destination chromatic coordinate in the vector field, wherein the destination chromatic coordinate indicates a transfer color for the pixels corresponding to the source chromatic coordinate.

11. The article of claim 9, wherein the instructions to build a voting table comprise instructions to build a voting table for the luminosity channel.

12. The article of claim 9, further comprising instructions that if executed enable the system to:
    concatenate a first voting table from a first image to a second image, and a second voting table from the second image to a third image; and
    construct a vector field from the concatenated voting table.

13. The article of claim 12, wherein the second image is a false color image.

14. The article of claim 9, further comprising instructions that if executed enable the system to:
    build separate voting tables for sub-regions of an image; and
    interpolate the separate voting tables between the sub-regions.

15. The article of claim 9, further comprising instructions that if executed enable the system to smooth the vector field to reduce noise.

16. An apparatus, comprising:
a processor;
a voting table builder operative on the processor, to build a voting table, where each table cell is indexed by multi-dimensional chromatic coordinates from a source image and multidimensional chromatic coordinates from a destination image, and wherein building the table comprises:
for each pixel in the source image:
  incrementing a count stored in the table cell indexed by the chromatic coordinates of the source pixel and the chromatic coordinates of the source pixel's related destination pixel; and
  identifying a transfer color based on the voting table; and
an image color adjuster operative on the processor, to adjust the colors of the source image to the colors of the destination image according to the transfer colors.

17. The apparatus of claim 16, further comprising:
a communications component to receive a request for a color adjusted image and to transmit the adjusted source image in response to the request.

18. The apparatus of claim 16, wherein the destination image is a false color image.

19. The apparatus of claim 18, wherein the voting table builder builds a second voting table from the false color image to a reference image, and concatenates the first and second voting tables.

20. The apparatus of claim 16, wherein the source image is comprised of a plurality of source images, and the destination image comprises one image showing an area shown by the plurality of source images.

* * * * *